April 16, 1929.  R. E. LYFORD  1,709,480
DRIVING MECHANISM FOR VEHICLE WHEELS
Filed Aug. 9, 1926  3 Sheets-Sheet 1
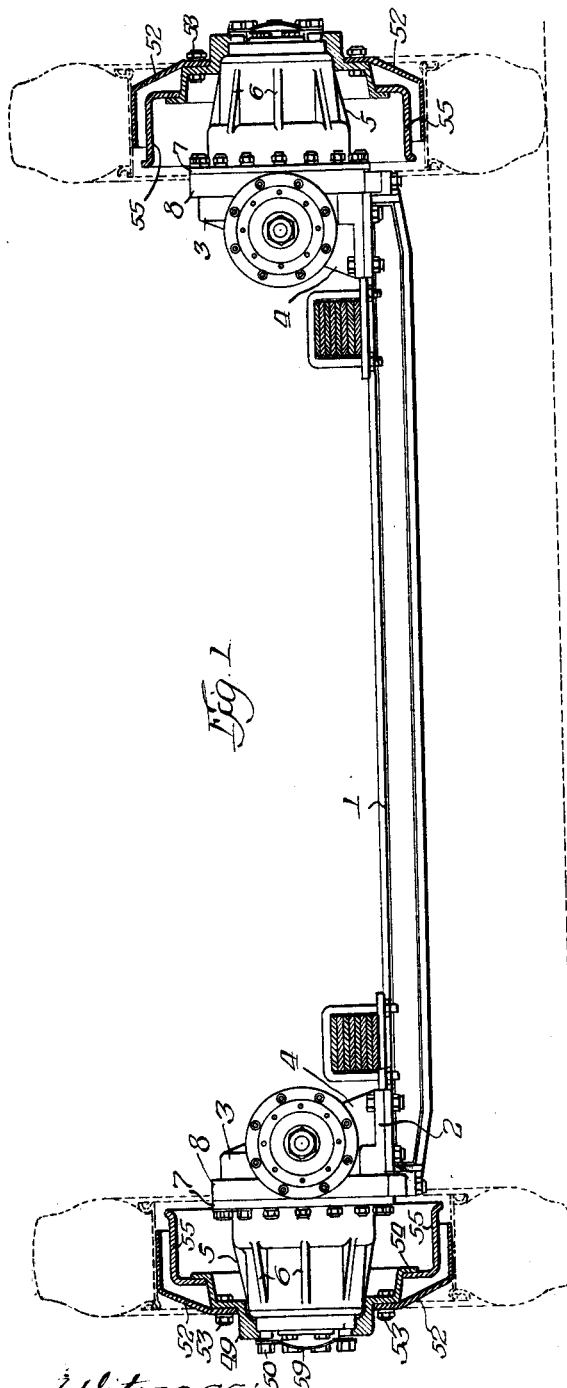
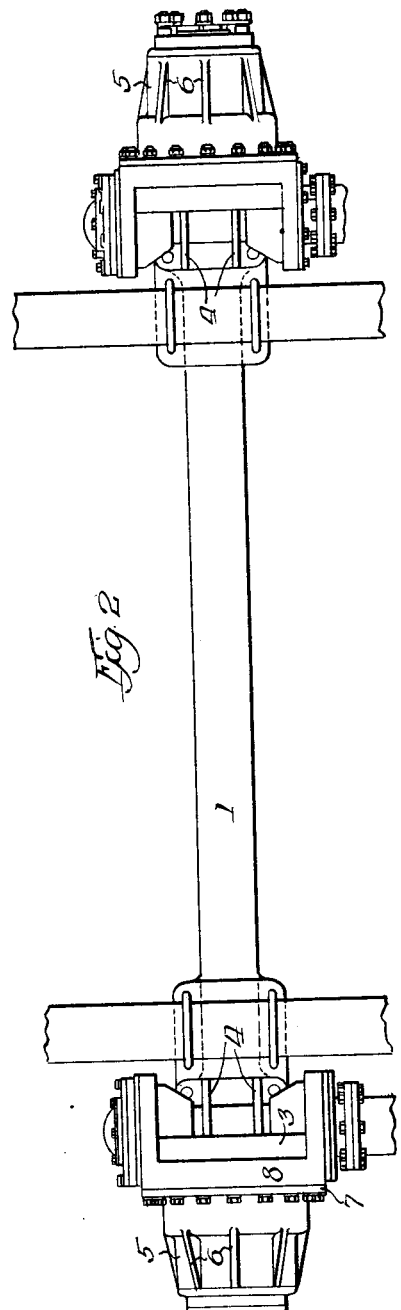
Inventor
Robert E. Lyford April 16, 1929. R. E. LYFORD 1,709,480
DRIVING MECHANISM FOR VEHICLE WHEELS
Filed Aug. 9, 1926 3 Sheets-Sheet 2
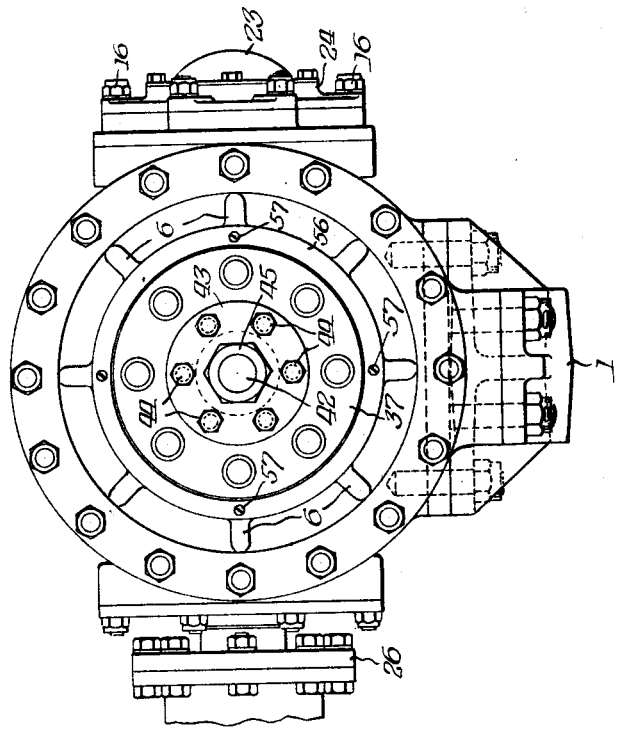
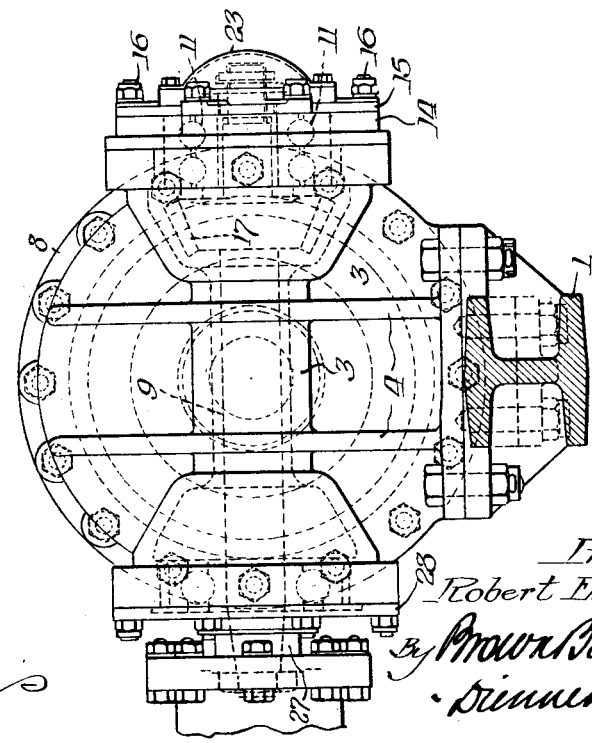
Inventor
Robert E Lyford

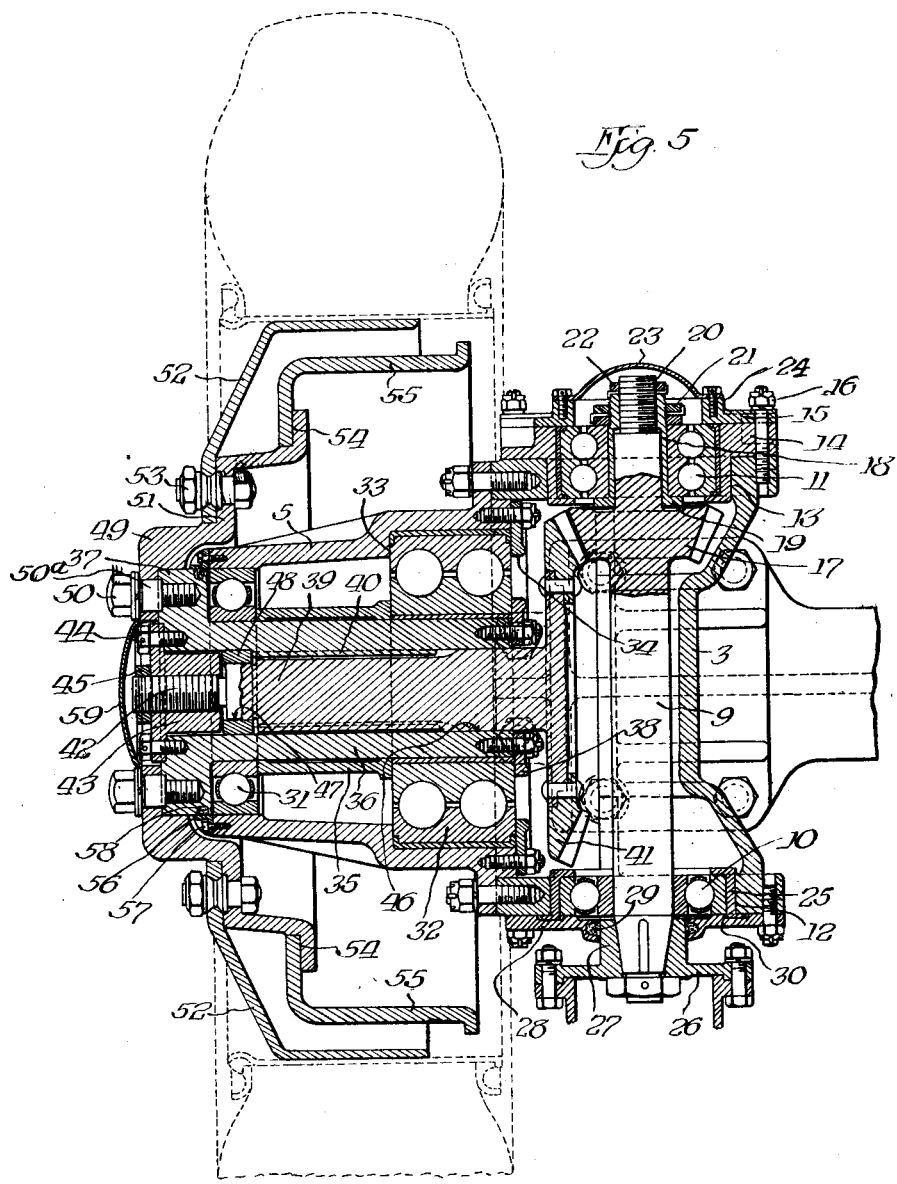

Patented Apr. 16, 1929.

1,709,480

UNITED STATES PATENT OFFICE.

ROBERT E. LYFORD, OF CHICAGO, ILLINOIS, ASSIGNOR TO INVENTION ENGINEERING CORPORATION, OF CHICAGO, ILLINOIS, A CORPORATION OF ILLINOIS.

DRIVING MECHANISM FOR VEHICLE WHEELS.

Application filed August 9, 1926. Serial No. 128,121.

My invention relates to vehicle drive mechanism and more particularly to an axle bearing driven traction wheel.

While I shall describe in connection with the specific embodiment herein illustrated, a rear axle with independently driven non-dirigible traction wheels, it is to be understood that certain of the features of the invention are applicable to axles bearing dirigible traction wheels and to axles bearing dirigible non-traction road wheels.

In a vehicle of the type disclosed in my co-pending application, Serial No. 123,039 filed July 17, 1926, when it is desired to maintain a low floor level and low center of gravity, it is undesirable to employ the usual form of drive comprising an engine mounted at the front of the chassis and a rear axle with a central longitudinal propeller shaft and differential with driving spindles extending laterally to the driving wheels, for the reason that this takes up too much vertical space at the point where the vertical dimension is of the greatest importance.

In that application I have disclosed a vehicle in which the engine is disposed at the rear of the vehicle, as closely adjacent the driven rear axle as possible. The drive then proceeds through a transmission and differential to two propeller shafts disposed longitudinally near the wheels at each side of the vehicle as disclosed in my co-pending application, Serial No. 130,737, filed August 21st, 1926.

The present application has to do more particularly with the rear axle and wheel drive when each wheel is driven by an independent longitudinal propeller shaft disposed closely adjacent the wheel.

The axle of my invention comprises three main units namely, a central dead axle member which may be of any required length for producing the desired gauge of the wheels and two independent wheel and drive units. In final assembled form these wheel and drive units are left and right but I have so designed the parts that lefts and rights may be produced from the same parts by proper assembly.

The intermediate axle section may be interchangeably employed with suitable knuckle members and dead spindles for a dirigible front axle construction.

In the preferred form of my invention herein illustrated I provide a combined gear box and bearing housing, containing first, the driving gears which may be bevel or spiral gears suitably held in mesh and provided with independent adjustments, and second, internal bearings for the tubular wheel spindle. The wheel spindle adjustably receives the stub shaft for one of the gears and at its outer end receives a hub and brake drum member to which the wheel proper is detachably connected.

In the specific embodiment which is herein disclosed the gear box for each wheel has mounted therein a driving shaft section with an integral pinion therein. A bearing is provided for the shaft preferably consisting of a double row of ball bearings at the end adjacent the pinion and a single row of ball bearings at the other end. A driving flange is connected to the latter end of the driving shaft, which flange is connected through a universal joint to another driving shaft section leading directly or indirectly to the engine. The other end of the housing is closed by a suitable closure preferably consisting of a ring which is clamped by bolts or studs to the flange of the housing with an intermediate bearing ring interposed for mounting and double row of ball bearings between said first ring and said flange. By this construction, end thrust on the double row of ball bearings in either direction is taken up. The end of the driving shaft adjacent the aforementioned closure has threaded thereon a flanged sleeve which extends through the said double row of ball bearings and is secured to the inner race thereof. A pair of lock nuts on the said sleeve act to hold the said bearing against the flange on said sleeve. The shaft section may be adjusted longitudinally relative to the sleeve by rotating said sleeve for moving the pinion on said section relative to the gear connected to the vehicle wheel.

The other end of the gear box is also provided with a removable ring for supporting the single row of ball bearings.

The aforementioned gear in mesh with the driving pinion on the driving shaft is rigidly secured on a live spindle which is splined in a driving sleeve, the latter being rotatably mounted in the bearing housing. The outer end of the driving sleeve has bolted thereto a hub member which is preferably in the form of a disc to which is removably bolted the wheel disc. The hub member also extends inwardly above the bearing housing and has secured on the inward portion thereof a brake drum, the brake mechanism for which may be suitably secured on either the said bearing housing, gear box, or axle.

The said spindle has longitudinally threaded thereon at its outer end a nut member which is provided with flanges through which it is removably bolted to the outer end of the driving sleeve. The purpose of the nut member threaded on the outer end of the spindle is for adjusting the longitudinal position of said spindle relative to the driving sleeve for adjusting the gear on said spindle relative to the pinion on the driving shaft. Thus, means are provided for relatively adjusting the said gear and pinion in two directions normal to each other.

Other advantageous features of this invention will be apparent from the specification and claims when taken in connection with the accompanying drawings, wherein Fig. 1 represents an elevational view partly in section and with parts removed showing an axle having a driving mechanism thereon embodying this invention;

Fig. 2 is a plan view of the same with parts removed;

Fig. 3 is a side elevation from the right of Fig. 2;

Fig. 4 is a side elevation of my novel drive taken from the left of Fig. 2;

Fig. 5 is an enlarged fragmentary view with parts in elevation showing a horizontal section through the center of the driving shaft and spindle.

Referring to the drawings more particularly, numeral 1 designates an axle in the form of an I beam which is connected at each of its ends to a pad 2 at the bottom of a gear box 3 and integral therewith. This axle 1 may be made up in suitable lengths for securing the desired gauge of the wheels without alteration of the other parts described below. A pair of integral brackets 4 on the gear box 3 act to reenforce the pad 2. A bearing housing 5 substantially cylindrical in shape slightly tapered toward its outer end and having reenforcing ribs 6 on its outer periphery, is bolted to the outer face of its corresponding gear box 3 through means of bolting flanges 7 and 8 on said housing and box, respectively. A driving shaft section 9 extends transversely of the axle 1 and is mounted in the box 3 in suitable bearings preferably consisting of a single row of ball bearings 10 at one end of said shaft, and a double row of ball bearings 11 at the other end of said shaft. The gear box 3 is provided with a pair of openings 12 and 13 at either end thereof for receiving the mountings for the bearings 10 and 11, respectively. The mounting for the bearing 11 consists of a ring 14 resting on a flange on the box 3 surrounding the opening 13. The ring 14 is provided with an inwardly extending cylindrical portion having a supporting flange at its inner end, said flange being adapted to abut the inner edge of the bearing 11. A retaining ring 15 is mounted outside of the ring 14, its inner edge overlapping the outer edge of the bearing 11 and holding the same against the inner flange on the ring 14. The ring 15 is provided with a plurality of bolts 16 surrounding its periphery and extending through the ring 14 into the box 3. Thus the bearing 11 is held securely between the rings 14 and 15 at all times, except when it is desired to disassemble any of the various parts. The shaft 9 is provided with an integral bevel pinion 17 thereon which meshes with the gear connected to the wheel which will be described hereinafter.

Means are provided for adjusting the relative position of the pinion 17 with respect to the aforementioned gear. Such means consists of a sleeve 18 which extends through the inner race of the bearing 11 and is provided with a flange 19 at its inner edge for abutting the inner edge of said race, and an interiorly threaded portion in threaded engagement with a threaded portion 20 of the shaft 9, near the outer end thereof. The sleeve 18 is also exteriorly threaded outside of the bearing 11 and at its outer end is slabbed to a hexagon or like form and is provided on the threaded part with a pair of lock nuts 21 for locking said bearing against the flange 19. The outer end of the sleeve 18 is adapted to be engaged by a wrench or other tool for turning said sleeve on the threaded portion 20. A lock nut 22 is also provided at the outer end of the sleeve 18 for locking sleeve 18 on the threaded portion 20.

A metal cap or closure 23 is bolted to an annular shoulder 24 on the ring 15.

The bearing 10 is supported within the opening 12 through means of a bearing ring 25 having an inner flange for abutting the inner edge of said bearing and an outer flange 30 resting on the outer edge of said opening. A companion flange 26 is suitably secured to the shaft 9 exteriorly of the box 3 and may be provided with an inner hub 27. A closure plate 28 which forms a bearing retainer bolted to a suitable flange surrounding the opening 12 is provided with a groove for a felt packing ring 29 for the hub 27 and an annular recess for loosely receiving the outer flange 30 of the ring 25. The closure 28 bears against the outer race of bearing 10 and presses it against the inner flange of sleeve 25. The driving flange 26 may be connected through a universal joint to another driving shaft section leading directly or indirectly to the engine.

The bearing housing 5 is provided with a single row of ball bearings 31 in its outer end and a double row of ball bearings 32 in its inner end. The outer edge of the bearing 32 abuts a circular shoulder 33 on the inner periphery of the housing 5 and the inner edge of said bearing is provided with a retaining ring 34 which abuts said inner edge and is secured through suitable bolts to the inner end of the bearing housing. The bearings 31 and 32 are spaced from each other by a cylindrical member 35 extending therebetween. A sleeve 36 driven by live spindle 39 is mounted in the bearings 31 and 32, and is provided with a circular flange 37 at its outer end and a retaining ring 38 removably bolted thereto at its inner end and abutting the edge of the bearing 32.

A live spindle 39 is mounted in the sleeve 36 and is held against rotation therein by splines 40, said splines transmitting the entire driving torque. A bevel gear 41, referred to above, is rigidly secured on the inner end of the spindle 39 and is in mesh with the driving bevel pinion 17. The outer end of the spindle 39 is provided with a reduced cylindrical portion 42 on which is threaded a flanged nut 43. The nut 43 has a plurality of bolts 44 extending through the flange thereof and threadedly engage in the end of the sleeve 36. A lock nut 45 on the outer end of the threaded portion 42 acts to hold the threads of said portion tight in the nut 43. These lock nuts take no driving torque. The spindle 39 has a cylindrical bearing 46 at its inner end and a reduced cylindrical bearing 47 inwardly of the threaded portion 42 and operable through a ring 48 within the driving sleeve to absorb radial loads only generated by the mesh of the pinion and ring gear. The flanged nut 43 thus affords an adjustable connection between the spindle 39 and the sleeve 36 for varying the axial position of said spindle and thus adjusting the relative position of the gear 41 with respect to the pinion 17.

A hub member 49 preferably in the shape of an inwardly stepped ring is bolted at its inner periphery through means of bolts 50 and integral driving lugs 50^A to the flange 37 of the sleeve 36. On the inner step 51 of the ring 49 is bolted a wheel disc 52, the bolts 53 preferably consisting of standard Michelin bolts. The ring 49 extends inwardly beyond the step 51 to provide a second step or flange 54 to which is secured the brake drum 55. A suitable brake mechanism is connected to the housing 5, the box 3 or the axle 1, for expanding brake shoes (not shown) into the drum 55.

A flanged ring 56 is held on the outer end of the housing 5 through means of screws 57 and engages a felt-gasket 58 lying in a groove on the periphery of the flange 37, for preventing leakage of oil from the interior of the housing 5.

According to the operation of the device, the shaft 9 is driven either directly or indirectly from the engine through the driving flange 26. The shaft 9, in turn, through means of the pinion 17 and gear 41 meshing therewith, drives the spindle 39. The spindle 39 through its connection with the sleeve 36 comprising the spline 40, drives said sleeve together with the vehicle wheel rigidly secured thereto.

The pinion 17 may be adjusted axially by removing the cap 23, loosening the lock nut 22, turning the sleeve 18 until the desired adjustment is obtained, tightening the lock nut 22 again and replacing the cap 23. The lock nuts 21 constitute merely a removable flange which after it is once properly applied remains fixed in place throughout this adjustment of pinion 17.

The pinion and its bearing 11 may be removed as a unit by removing nuts 16 and removing the companion flange retaining nut at the opposite end of shaft 9.

The gear 41 may be adjusted axially for varying the distance thereof to the pinion 17 by removing the cap 59 which is held on the outer end of the ring 49 by screws (not shown) between the bolts 50, loosening the lock nut 45, removing the bolts 44, turning the flanged nut 43 to effect the desired adjustment and replacing the aforementioned lock nuts, bolts, and cap. With simple changes the same general structure may be employed for front axle and wheel construction either driving or non-driving front wheels.

The aforedescribed axle and driving mechanism is particularly well adapted for use in connection with the bus construction shown and described in connection with my co-pending application for U. S. Letters Patent, Serial No. 1,123,039, filed July 17, 1926.

I am aware that many changes may be made and many details of construction varied throughout a wide range without departing from the principles of this invention, and I do not propose limiting the patent granted hereon to the details shown or described.

I claim:—

1. The combination with an axle, of a gear housing secured adjacent one end thereof, a wheel secured to said housing and having a gear rotatable therewith, a driving shaft in said housing having a gear fixed thereon in mesh with said first gear, bearings for said shaft and means for longitudinally adjusting said shaft relative to said bearings for relatively moving said gears toward or away from each other.

2. The combination with an axle, of a gear housing secured adjacent one end thereof, a wheel secured to said housing and having a gear rotatable therewith, a driving shaft in said housing having a gear fixed thereon in mesh with said first gear, said driving shaft having a bearing including an outer and an inner bearing portion, and a threaded connection between the inner portion and the shaft for adjusting the latter longitudinally relative to the bearing and for relatively moving said gears toward or away from each other.

3. The combination with an axle, of a gear housing secured adjacent one end thereof, a wheel secured to said housing and having a gear rotatable therewith, a driving shaft in said housing having a gear in mesh with said first gear, said driving shaft having a bearing including an outer and an inner bearing portion, a sleeve on said shaft extending through said inner bearing portion and having a flange at one end thereof for abutting one end of said portion, said sleeve being threaded interiorly on said shaft, said sleeve having exterior threads thereon, and locking means engageable with said threads for holding said bearing against said flange.

4. The combination with an axle, of a gear housing secured adjacent the end thereof, a bearing housing secured to said first housing and having a spindle rotatable therein, a driving shaft in said first housing having a gear fixed thereon, a gear on said spindle meshing with said first gear, and a vehicle wheel supported by said bearing and connected to said spindle, the connection between said wheel and spindle including means for longitudinally adjusting the latter for moving said gears relative to each other.

5. The combination with an axle of a bearing at the end thereof, a wheel supported by said bearing, a gear connected to said wheel, and a driving shaft and gear fixed thereon supported adjacent said first gear, the said gears being in mesh with each other, the connection between said first gear and the wheel including means for adjustably moving said first gear axially of said wheel for moving it toward or away from the other gear.

6. The combination with an axle, of a gear housing secured adjacent the end thereof, a bearing housing secured to said first housing and having a rotatable sleeve therein, a wheel mounted on said sleeve, a spindle secured against rotation and axially slidable in said sleeve, a gear on said spindle rigidly connected thereto, a driving shaft in said first housing having a gear thereon in mesh with said first gear, and an adjustable connection between said spindle and sleeve for varying the axial position of said spindle.

7. The combination with an axle of a bearing housing secured at one end thereof and having a spindle rotatable therein, a driving shaft supported adjacent the end of said axle and having a gear fixed thereon in mesh with a gear on said spindle, and a vehicle wheel supported by said bearing housing and connected to said spindle, the connection between said wheel and spindle including means for lonitudinally adjusting the latter for moving the gears relative to each other.

8. The combination with an axle having a bearing housing secured to one end thereof, said housing having a rotatable sleeve therein, a wheel mounted on said sleeve, a spindle secured against rotation and axially slidable in said sleeve, a gear on said spindle rigidly connected thereto, a driving shaft supported on said axle adjacent said housing and having a gear thereon in mesh with said first gear, and an adjustable connection between said spindle and sleeve for varying the axial position of said spindle.

9. The combination with an axle, of a gear housing secured adjacent the end thereof, a bearing housing secured to said first housing and having a rotatable sleeve therein, a wheel mounted at the outer end of said sleeve, a spindle secured against rotation and axially slidable in said sleeve, a gear on the inner end of said spindle and rigidly connected thereto, a driving shaft in said first housing having a gear thereon in mesh with said first gear, and an adjustable connection at the outer end of said spindle for connecting the same with said sleeve for varying the axial position of said spindle.

10. The combination with an axle, of a bearing housing secured at one end thereof, a rotatable sleeve in said housing, a wheel mounted at the outer end of said sleeve, a spindle secured against rotation and axially slidable in said sleeve, a gear on the inner end of said spindle and rigidly connected thereto, a driving shaft supported on said axle and having a gear thereon in mesh with said first gear, and an adjustable connection near the outer end of said spindle for connecting the same to said sleeve for varying the axial position of said spindle.

11. The combination with an axle, of a bearing housing secured at one end thereof, and having a rotatable sleeve therein, a wheel mounted on said sleeve, a spindle secured against rotation and axially slidable in said sleeve, a gear on said spindle rigidly connected thereto, a driving shaft mounted on said axle adjacent said housing and having a gear thereon in mesh with said first gear, and an adjustable connection between said spindle and sleeve for varying the axial position of said spindle, said connection including a member longitudinally threaded on the spindle and removably secured to the sleeve.

12. The combination with an axle, of a bearing housing secured to the end thereof and having a rotatable sleeve therein, a wheel mounted on said sleeve, a spindle secured against rotation and axially slidable in said sleeve, a gear on said spindle rigidly connected thereto, a driving shaft on said axle mounted adjacent said housing and having a gear thereon in mesh with said first gear, an adjustable connection between said spindle and sleeve for varying the axial position of said spindle, a reduced cylindrical portion on said spindle adjacent said connection, and a bearing ring in said sleeve for said portion.

13. The combination with an axle, of a bearing housing at one end thereof, said housing having a rotatable sleeve therein, a wheel mounted on said sleeve, a spindle secured against rotation and axially slidable in said sleeve, a gear on said spindle rigidly connected thereto, a driving shaft mounted on said axle adjacent said housing and having a gear thereon in mesh with said first gear, and an adjustable connection between said spindle and sleeve for varying the axial position of said spindle, said connection including a member longitudinally threaded on said spindle, said member having a flange at the outer end thereof removably bolted to said sleeve.

14. The combination with an axle, of a bearing at the end thereof, a wheel supported by said bearing, a gear connected to said wheel, a driving shaft and gear fixed thereon supported on said axle adjacent said first gear, the said gears being in mesh with each other, the connection between said first gear and wheel including means for adjustably moving said first gear axially of said wheel for moving said first gear toward or away from the other gear, and means for longitudinally adjusting said shaft for relatively moving said gears toward or away from each other.

15. In combination, an axle, a housing connected to an end of said axle, a drive shaft positioned in said housing and being disposed in a substantially horizontal plane, a sleeve connected to said housing, a wheel having its axis disposed above said axle and mounted on said sleeve, a spindle in said sleeve adapted to drive said wheel, gear means in said housing for operatively connecting said shaft to said spindle, and means for fastening said housing to the top of said axle.

16. In combination, an axle, a housing connected to an end of said axle, a drive shaft positioned in said housing and being disposed in a substantially horizontal plane, a sleeve connected to said housing, a wheel having its axis disposed above said axle and mounted on said sleeve, a spindle in said sleeve adapted to drive said wheel, a gear means in said housing for operatively connecting said shaft to said spindle, means for fastening said housing to the top of said axle, bearings for the spindle in said sleeve, means for enabling said spindle to be moved axially to compensate for wear in said bearings, bearings for said shaft in said housing, and adjusting means for enabling said shaft to be moved axially to compensate for wear in the bearings associated therewith.

17. In combination, an axle, a housing connected to an end of said axle, a drive shaft positioned in said housing and being disposed in a substantially horizontal plane, a sleeve connected to said housing, a wheel having its axis disposed above said axle and mounted on said sleeve, a spindle in said sleeve adapted to drive said wheel, a gear means in said housing for operatively connecting said shaft to said spindle, means for fastening said housing to the top of said axle, a driving shaft disposed above said axle and a flexible coupling between said drive shaft and said driving shaft.

18. In combination, an axle, a housing connected to one end of said axle, a drive spindle extending into said housing and carried by one end of said axle, anti-frictional bearings in said housing, a wheel disposed about said housing and a sleeve connected to said wheel and extending into said housing between the bearings and the spindle, said sleeve being driven by said spindle and serving to support said wheel.

In witness whereof I hereunto subscribe my name this 31st day of July, 1926.

ROBERT E. LYFORD.